(12) United States Patent
Ando et al.

(10) Patent No.: US 7,373,485 B2
(45) Date of Patent: May 13, 2008

(54) CLUSTERED SUPERSCALAR PROCESSOR WITH COMMUNICATION CONTROL BETWEEN CLUSTERS

(75) Inventors: Hideki Ando, Nagoya (JP); Hajime Shimada, Nagoya (JP); Atsushi Mochizuki, Nagoya (JP)

(73) Assignee: National University Corporation Nagoya University, Nagoya-Shi (JP)

( * ) Notice: Subject to any disclaimer, the term of this patent is extended or adjusted under 35 U.S.C. 154(b) by 228 days.

(21) Appl. No.: 11/071,794

(22) Filed: Mar. 3, 2005

(65) Prior Publication Data

US 2006/0095736 A1 May 4, 2006

(30) Foreign Application Priority Data

Sep. 1, 2004 (JP) ............................. 2004-254408

(51) Int. Cl.
*G06F 9/40* (2006.01)
(52) U.S. Cl. ........................................ 712/218; 712/23
(58) Field of Classification Search ................. 712/218
See application file for complete search history.

(56) References Cited

U.S. PATENT DOCUMENTS 5,699,537 A * 12/1997 Sharangpani et al. ....... 712/217
6,157,995 A * 12/2000 Asato .......................... 712/25
6,219,780 B1 * 4/2001 Lipasti ....................... 712/215
6,230,251 B1 * 5/2001 Batten et al. ................. 712/11

FOREIGN PATENT DOCUMENTS

JP 08-212070 8/1996

OTHER PUBLICATIONS

S. Palacharla, N.P. Jouppi, and J.E. Smith, "Complexity-Effective Superscalar Processors," Proceedings of 24th International Symposium on Computer Architecture, pp. 206-218, Jun. 1997.
J.L. Cruz, A. Gonzalez, M. Valero, and N.P. Tophan, "Multi-Banked Register File Architectures," Proceedings of 27th International Symposium on Computer Architecture, pp. 316-325, Jun. 2000.

* cited by examiner

*Primary Examiner*—Eddie Chan
*Assistant Examiner*—John Lindlof
(74) *Attorney, Agent, or Firm*—Workman Nydegger

(57) ABSTRACT

A clustered superscalar processor for reducing the miss rate of a register cache and reducing the possibility of miss penalties. The processor checks before storing an instruction in an instruction window whether there is a data dependency relationship between the instruction that will be stored in the instruction window and a previous instruction stored in the instruction window. When there is a data dependency relationship, the execution result of the previous instruction of one cluster is communicated to a register cache of another cluster that executes the instruction having a data dependency relationship with the previous instruction.

16 Claims, 10 Drawing Sheets

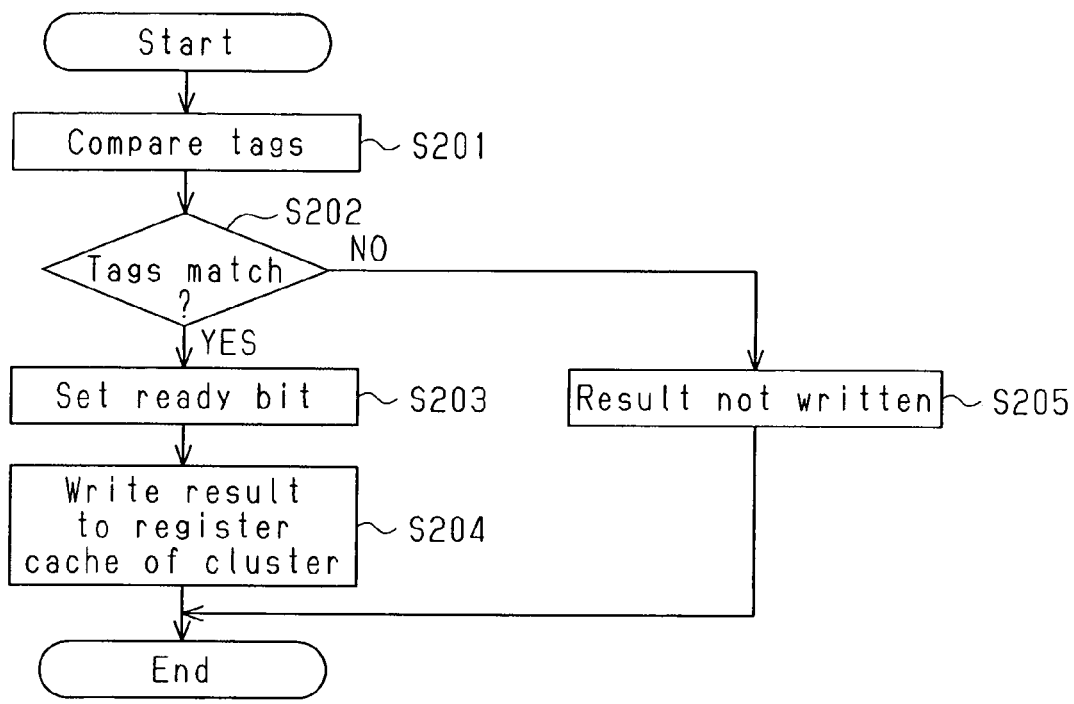
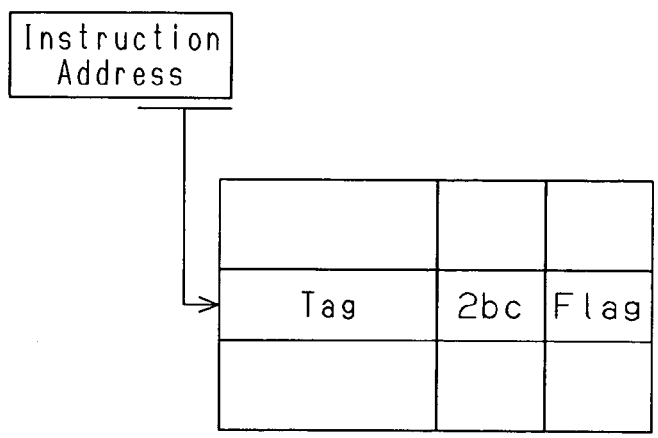
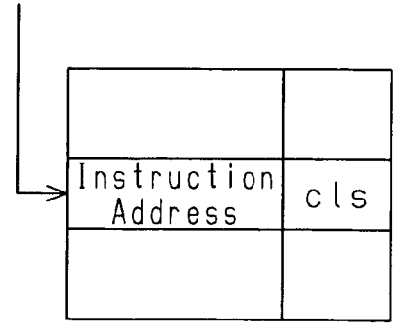

ered superscalar processor for solving problems that arise when executing instructions in parallel to improve the performance of a processor. The technique for clustering a superscalar processor is a technique that divides functional units, which execute instructions, and instruction windows, which temporarily store instructions, into a plurality of groups referred to as clusters. Each cluster includes a functional unit, an instruction window, and a register file for storing the execution result of a calculation. Execution results of the functional units, which are included in every cluster, are written to the register files, which are included in every cluster. Thus, the register files included in each cluster hold the same contents. FIG. 1 shows a clustered superscalar processor 100 of the prior art.

CLUSTERED SUPERSCALAR PROCESSOR WITH COMMUNICATION CONTROL BETWEEN CLUSTERS

BACKGROUND OF THE INVENTION

The present invention relates to a processor, and more particularly, to a clustered superscalar processor and a method for controlling communication between clusters in a clustered superscalar processor.

In the prior art, for example, S. Palacharla, N. P. Jouppi, and J. E. Smith, "Complexity-Effective Superscalar Processors," Proceedings of 24th International Symposium on Computer Architecture, pp. 206-218, June 1997 describes a clustWhen processing instructions, the processor 100 first stores instructions from a main memory (not shown) in an instruction cache 110. A fetch unit 120 reads the instructions from the instruction cache 110 and provides the instructions to a decoder 130. The decoder 130 decodes the instructions. A steering unit 140 analyzes data dependency relationship in each instruction and allocates the instructions, in accordance with the dependency relationship, to instruction windows 151 and 161 of the clusters 150 and 160. Instructions satisfying the data dependency relationship are read from the instruction windows 151 and 161, and data used to execute the instructions is read from the register files 152 and 162. Functional units 153, 154, 163, and 164 use the read data to execute the instructions. The execution results of the instructions are written to the register files 152 and 162. During the execution of the instructions, data is read from the main memory or a data cache 170 when necessary.

When the execution result of an instruction executed by the functional units 153, 154, 163, and 164 is used in an immediately subsequent instruction, the execution result is transferred to a subsequent instruction before the execution result is written to the register files 152 and 162. The transfer path of the execution result is hereafter referred to as a bypass route. The bypass route is configured by intra-cluster bypasses CIB, formed inside clusters, and an inter-cluster bypass CBB, formed between clusters.

In this manner, by clustering a superscalar processor, the quantity of functional units in each cluster may be reduced in comparison to a superscalar processor that is not clustered. The reduction in the quantity of the functional units shortens the wire length for the intra-cluster bypass routes and reduces wire delays.

However, in a clustered processor, the size of the register file required in each cluster is substantially the same as that of a register file in a processor that is not clustered. Thus, the wire length and wire delay of the register file are not shortened. J. L. Cruz, A. Gonzalez, M. Valero, and N. P. Tophan, "Multiple-Banked Register File Architectures", Proceedings of 27th International Symposium on Computer Architecture, pp. 316-325, June 2000 describes a hierarchical register file as an example of a technique for eliminating delay of the register file. FIG. 2 shows a processor 200 incorporated in a hierarchical register file. The hierarchical register file is configured by a register cache RC (upper level register file) and a main register file (lower level register file). The register cache RC is incorporated in a data path. The capacity of the register cache RC is smaller than that of the main register file MRF, and the register cache RC may be accessed at high speeds. The main register file MRF holds every calculation result of functional units 251 to 254. The register cache RC holds some of the values of the main register file MRF.

When a value necessary for an instruction exists in a register cache RC, the functional units 251, 252, 253, and 254 access the register cache RC to retrieve a register value within a shorter access time than when accessing the main register file MRF. When a necessary value does not exist in the register cache RC, the functional units 251, 252, 253, and 254 retrieve a register value only after the register value is transferred from the main register file MRF to the register cache RC. This requires a long access time.

A state in which the data requested by the processor exists in the register cache RC is referred to as a hit, and a state in which it does not exist in the register cache RC is referred to as a miss. Further, the percentage in which the accessed data is found in the register cache RC is referred to as a hit rate, and the percentage in which the accessed data is not found in the register cache RC is referred to as a miss rate. The time required to access the register cache RC is referred to as hit time. The reference time required to access the main register file MRF is referred to as a miss penalty.

The register RC is small and fast. Thus, the hit time (e.g., one clock cycle) is shorter than the access time of the register file prior to hierarchization.

To further reduce the access time of the register file, the above-described hierarchical register file and the clustered superscalar processor may be combined. More specifically, the main register file MRF shown in FIG. 1 is added to the processor 100 shown in FIG. 1, and the register files 152 and 162 of the clusters 150 and 160 are changed to the register cache RC. However, incorporation of the above hierarchical register file in the clustered superscalar processor would lead to the problems described below.

In the prior art method, the execution result of an instruction is written to the register cache RC of every cluster. The register cache RC can hold only some of the values of the main register file MRF. Thus, to effectively use the register cache RC, it is preferred that only the register values necessary for the instruction executed prior to the present instruction be held. It is known that the execution result of an instruction is referred to only in a small number of calculations. Accordingly, among the execution results copied for each cluster, only some are referred to. The remaining execution results that are not referred to consume the memory area of the register cache in an unnecessary manner. This increases the possibility of deletion of useful register values that are stored in the register cache RC and have the possibility of being referred to. This increases the miss rate of the register cache RC, and the miss penalty lowers the performance.

SUMMARY OF THE INVENTION

The present invention provides a clustered superscalar processor and a method for controlling communication between clusters in a superscalar processor that decreases the miss rate and improves the performance of the register cache.

A first aspect of the present invention provides a clustered superscalar processor. The clustered superscalar processor includes a plurality of clusters, each including an instruction window for storing an instruction, an upper level register file for receiving an instruction from the instruction window, outputting a register value in accordance with the instructions, and storing an execution result of the instruction, and a functional unit for executing the instruction with the register value. A lower level register file, connected to the plurality of clusters, stores execution results of the functional units. A bypass route is connected between the plurality of clusters. A control unit communicates the execution result of the instruction generated by the functional unit of one of the clusters to another cluster via the bypass route.

A second aspect of the present invention provides a method for controlling communication between clusters in a clustered superscalar processor. The clustered superscalar processor includes a plurality of clusters, each including an instruction window for storing an instruction, an upper level register file for receiving an instruction from the instruction window, outputting a register value in accordance with the instructions, and storing an execution result of the instruction, and a functional unit for executing the instruction with the register value. A lower level register file, connected to the plurality of clusters, stores execution results of the functional units. A bypass route is connected between the plurality of clusters. The method includes generating an execution result of an instruction of the functional unit of one of the clusters, and communicating the generated execution result via the bypass route to another cluster that requires the generated execution result.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 7 is a flowchart illustrating the procedures for processing selective global communication in the clustered superscalar processor of the second embodiment;

FIG. 8(a) is a hardware structural diagram illustrating a global communication determination table for selective global communication of a clustered superscalar processor according to a third embodiment of the present invention, and FIG. 8(b) is a hardware structural diagram illustrating a global communication request table;

DETAILED DESCRIPTION OF THE PREFERRED EMBODIMENTS

Figure 1:
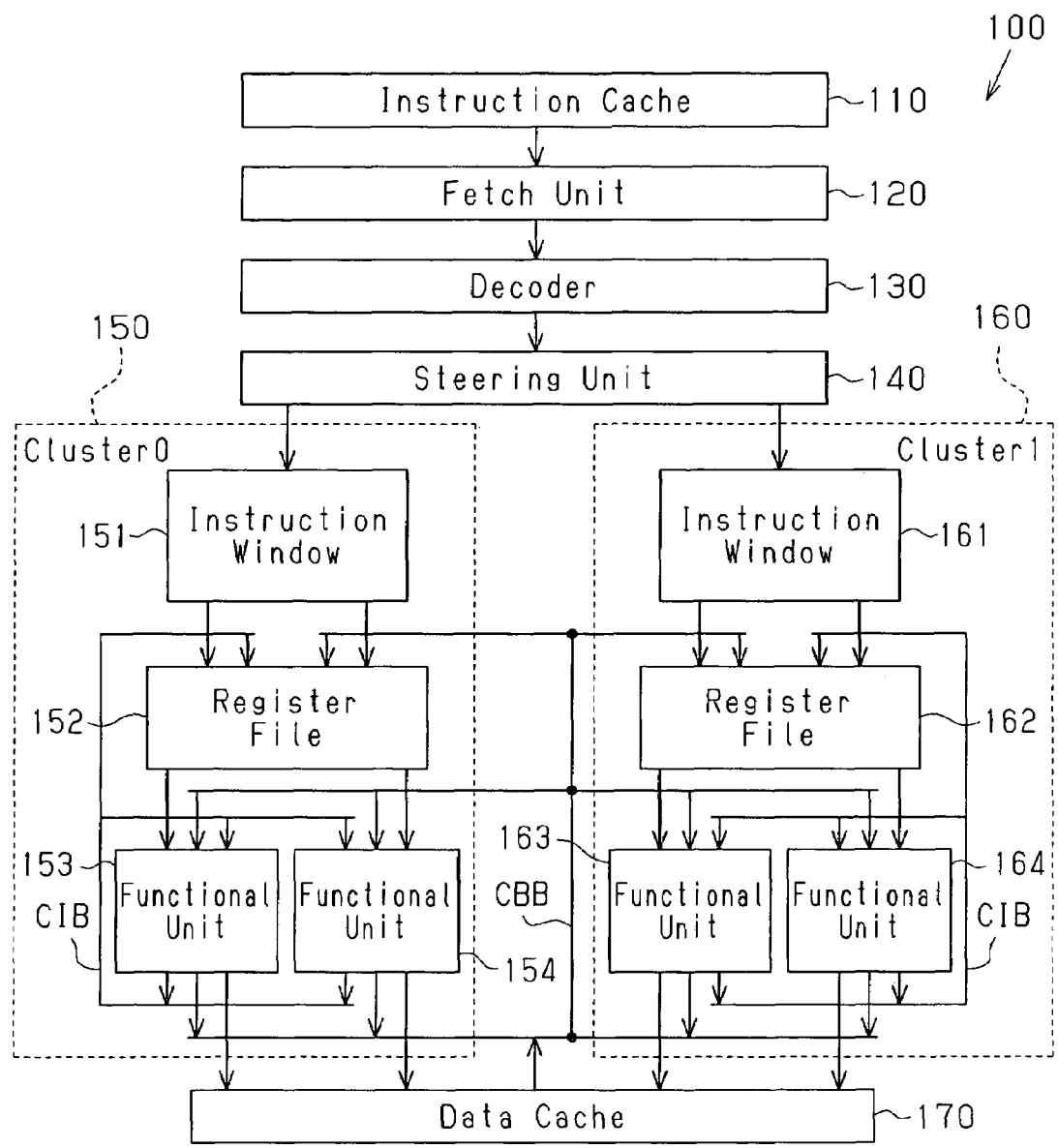
FIG. 1 is a schematic block diagram showing a clustered superscalar processor in the prior art.
Figure 2:
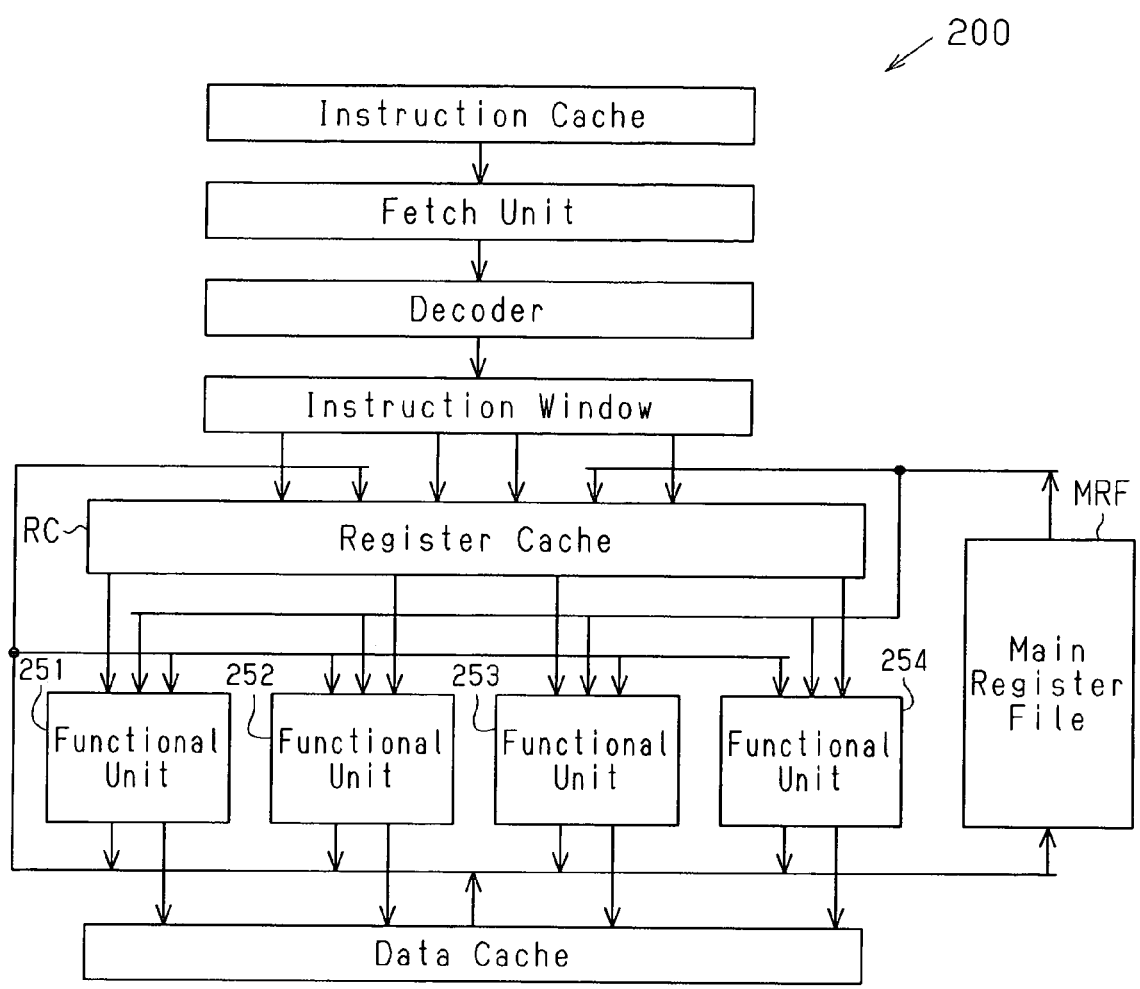
FIG. 2 is a schematic block diagram showing a processor incorporating a hierarchical register file in the prior art.
Figure 3:
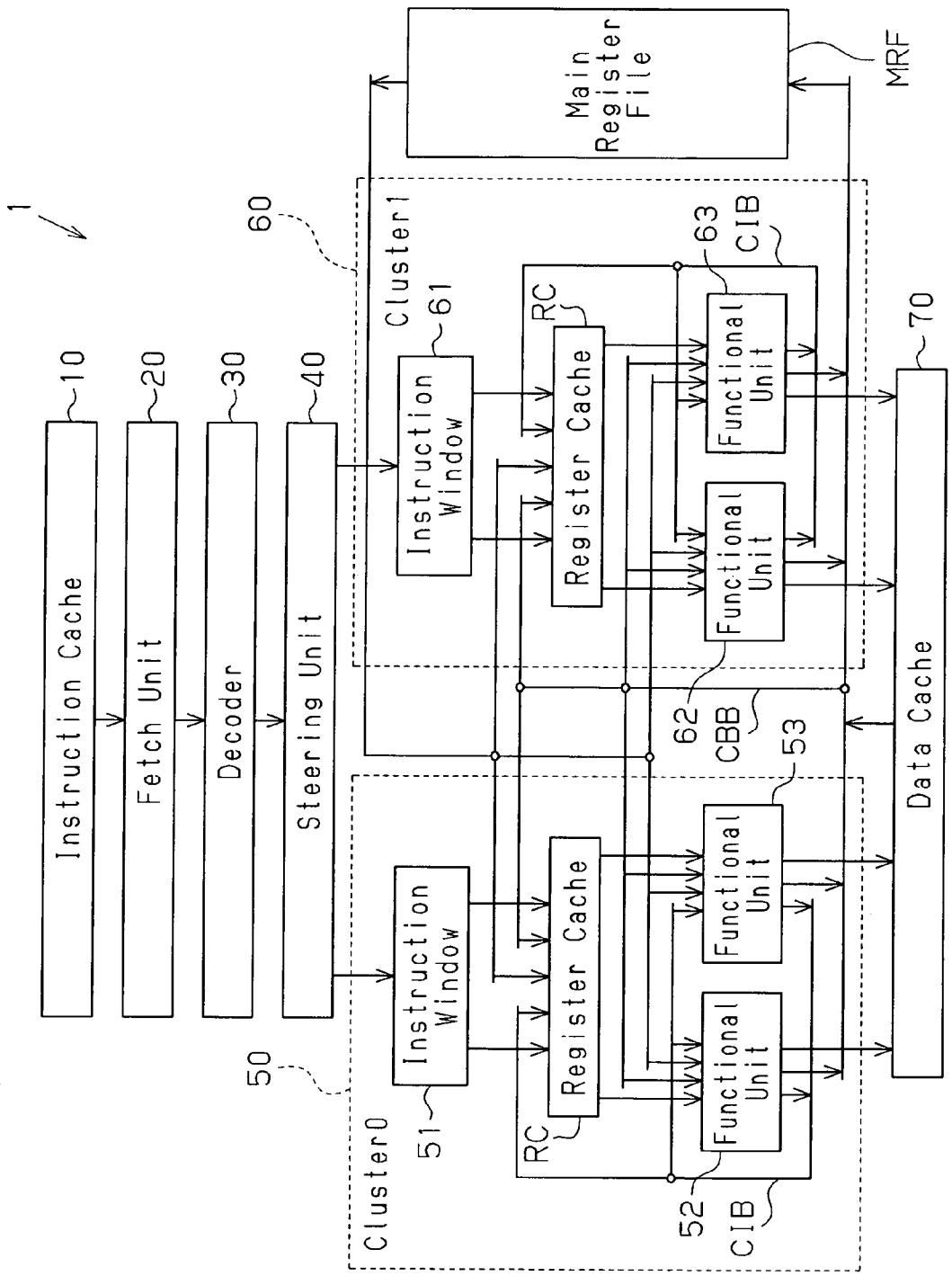
FIG. 3 is a schematic block diagram showing a clustered superscalar processor according to a first embodiment of the present invention.

A clustered superscalar processor 1 according to a first embodiment of the present invention is described hereinafter with reference to the drawings. FIG. 3 is a schematic block diagram of the clustered superscalar processor 1. The clustered superscalar processor 1 incorporates a hierarchical register file, and each cluster has a register cache RC in place of the register file of each cluster in the conventional processor 100 of FIG. 1. Only one main register file MRF is provided for the entire processor 1, and it holds every register value. When an instruction result is generated, the instruction result is always written to the main register file MRF.

Execution results are written to the register caches RC based on various write policies described later. Writing to the register caches RC may be divided into writing to the register caches RC of clusters belonging to instructions of the output results, and writing to register caches RC of other clusters.

As shown in FIG. 3, the processor 1, which is a clustered superscalar processor incorporating a hierarchical register file, includes an instruction cache 10, a fetch unit 20, a decoder 30, a steering unit 40, a plurality of (two in FIG. 3) clusters 50 and 60, the main register file MRF, and a data cache 70. The cluster 50 includes an instruction window 51, a register cache RC, and a plurality of (two in FIG. 3) functional units 52 and 53. The cluster 60 includes an instruction window 61, a register cache RC, and functional units 62 and 63.

In the instruction processing of the processor 1, instructions are read from a main memory and written to the instruction cache 10 based on access to the main memory (not shown) of the processor 1. The fetch unit 20 reads instructions from the instruction cache 10 (instruction fetch), and the decoder 30 decodes the read instruction. The steering unit 40 analyzes the dependency relationship between the decoded instructions (the data dependency relationship is the relationship between a previous instruction generating a certain execution result, and a subsequent instruction using that execution result), and the instructions are selectively allocated to the instruction windows 51 and 61 of the clusters 50 and 60 in accordance with the dependency relationship.

Each of the instruction windows 51 and 61 holds a plurality of decoded instructions, and executable instructions satisfying the data dependency relationship are read from the instruction windows 51 and 61. Various structures may be used to realize the instruction windows 51 and 61, and the windows 51 and 61 are not limited to a specific structure in the present invention. Thus, any such structure may be used individually or in combination. The windows 51 and 61 may be configured by, for example, employing a content addressable memory (CAM) or a first-in-first-out (FIFO) queue.

Instructions satisfying the data dependency relationship are read from the instruction windows 51 and 61, and data used in the execution of the instructions are read from the register caches RC, and the functional units 52, 53, 62, and 63 execute the instructions using the read data. The instruction execution result is written to the register cache RC and the main register file MRF.

When executing instructions, data is read from the data cache 70 as required, and after calculations are executed, the calculation result is written to the register cache RC and the main register file MRF. When the execution results calculated by the functional units 52, 53, 62, and 63 are used in subsequent calculations, the execution result is transferred to subsequent instructions through a bypass route within the cluster before being written to the register cache RC. The bypass route is configured by intra-cluster bypasses CIB, formed inside clusters, and an inter-cluster bypass CBB, formed between clusters.

The steering unit 40 allocates and registers the instructions to the instruction windows 51 and 61 of the clusters 50 and 60 depending on the data dependency relationship. An example of an allocation method, which considers the data dependency relationship, is described below.

The steering unit 40 has a table indexed by destination physical register numbers (dst). The dst of the table are the numbers of the clusters, which register the instructions that output an execution result. When an instruction is sent to the steering unit 40, the table is first indexed using a first source operand (src1) of the instruction to obtain the number of the cluster which is provided with the value of the src1 from the table. If the instruction can be registered in the instruction window of the cluster unit corresponding to the obtained cluster number, the instruction is registered in that cluster. When the instruction cannot be registered in that cluster, the same process is performed using a second source operand (src2). When a cluster for registering the instruction cannot be determined using the src2, the instruction is registered in a cluster having an empty instruction window. Finally, the number of the cluster in which the instruction is registered is written as an entry (registration item) in the table corresponding to the destination operand of the registered instruction.

Since the capacity of the register cache RC is relatively small, register cache misses increase and the performance is lowered if valid values cannot be held. Therefore, it is important which value is written to the register cache RC.

The simplest write policy of the upper level register file is to write all results to all upper level register files. Since this method also writes unnecessary values, this method increases the possibility of a loss of necessary values from the upper level register files and lowers performance due to the increase in register cache misses. From the results, when it is found that a value generated in one cluster is used by another cluster, only that value is selectively used in global communication.

In the selective global communication of the first embodiment, the current condition of the instruction windows 51 and 61 are checked, and a check is made as to whether or not an instruction dependent on that execution result exists in another cluster before the execution result of that instruction is output. When such an instruction exists, the execution result is global communicated to the register cache RC of that cluster. The execution result is global communicated only to the register cache RC of the clusters that will certainly use the execution result. Thus, this method prevents pollution of the register cache RC with unnecessary values (prevents the writing of data that is not used by the register cache within the cluster (that is, unnecessary data) to the register cache RC) such that the register cache RC may be efficiently used. Hereafter, this method will be referred to as "on-the-fly." In order to realize "on-the fly" in the present embodiment, selective global communication is accomplished through a "request-and-write" method.

Figure 4A:
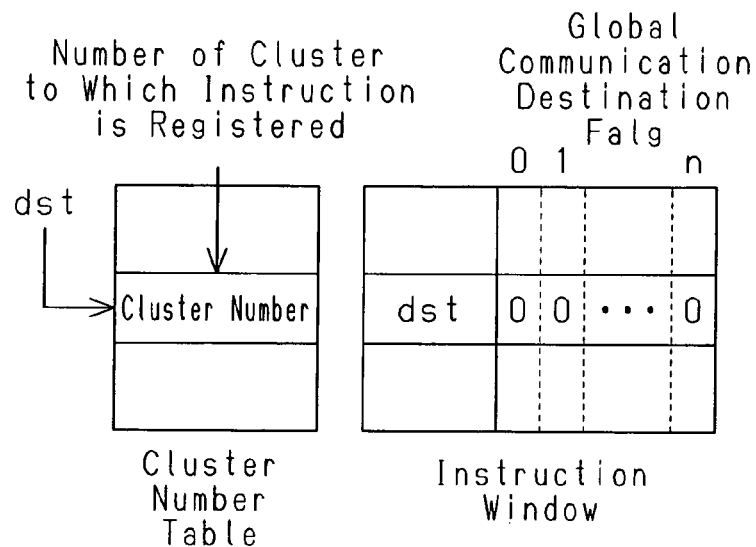
FIG. 4(a) is a hardware structural diagram illustrating a method for registering an instruction in selective global communication of the clustered superscalar processor shown in FIG. 3.
Figure 4B:
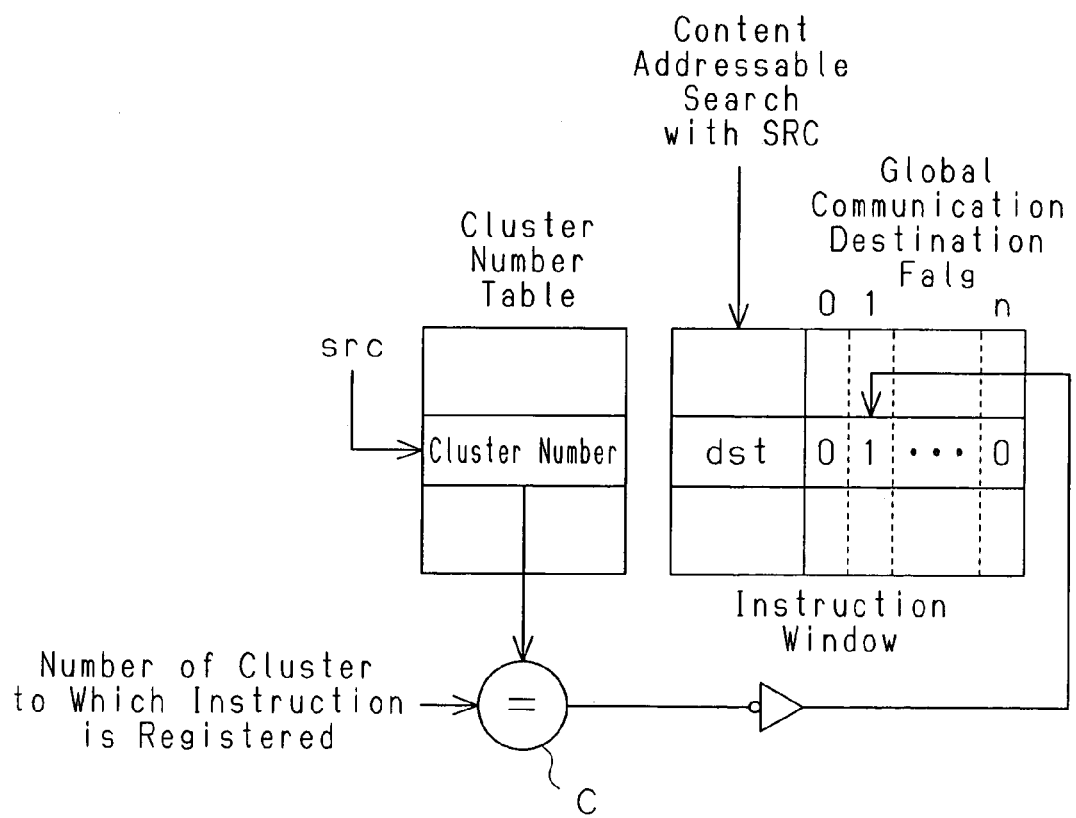
FIG. 4(b) is a hardware structural diagram illustrating a method for registering a global communication request.
Figure 5:
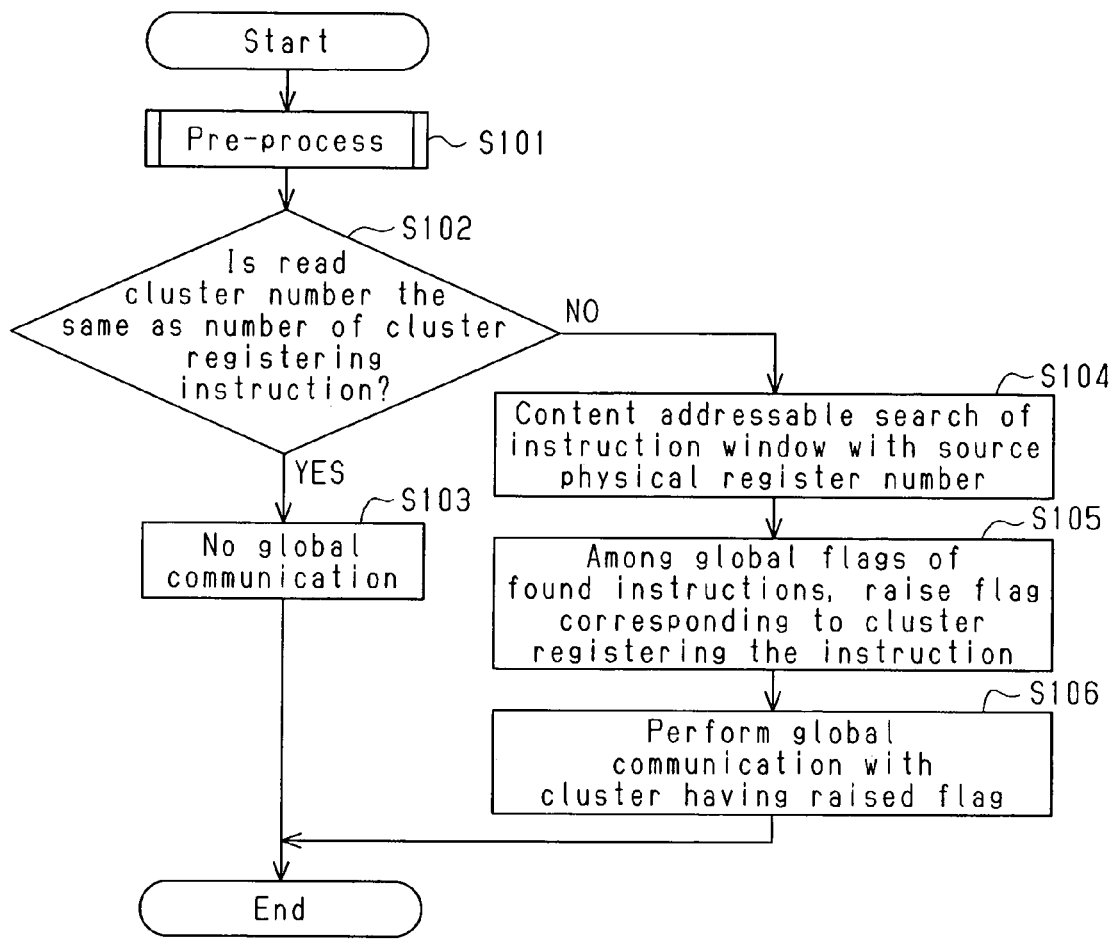
FIG. 5 is a flowchart illustrating the procedures for processing selective global communication in the clustered superscalar processor shown in FIG. 3.

The "request-and-write" method will now be described with reference to FIGS. 4 and 5. FIG. 4(*a*) is a hardware structural diagram showing an instruction registration method, and FIG. 4(*b*) is a hardware structural diagram showing a global communication request registration method. FIG. 5 is a flowchart illustrating the request-and-write processing procedures.

Request-and-write will first be summarized. In request-and-write, before writing an instruction to the instruction windows 51 and 61, the control unit checks whether or not a previous instruction, which has a data dependency relationship with the instruction to be written, exists in the instruction windows 51 and 61 (step S102 described later). When a previous instruction having a data dependency relationship exists in a cluster differing from the cluster in which the instruction is to be registered, the control unit specifies the previous instruction in the instruction window (step S104 described later), and a request is output for global communication of the execution result to the cluster to which the specified instruction is allocated (step S105 described later). After execution of the instruction is completed, the cluster, which is the subject of this request, global communicates the instruction execution result to the register cache RC of the indicated cluster (step S106 described later).

In order to realize "on-the-fly" in "request-and-write," a cluster number table is prepared in which the destination physical register numbers are indexed as shown at the left in FIG. 4(*a*). Each element of the cluster number table is the number of a cluster which outputs an execution result. Furthermore, a flag indicating the global communication destination is added to each entry (registration item) of the instruction window of each cluster. This flag is a bit vector corresponding to the cluster number table (data structure configured by an n number of bit strings). In order to update the global communication flag, the entry for the destination physical register number in the instruction window is set in the CAM (content addressable memory). The content addressable memory indicates the position of data stored in the memory with content rather than with an address. The content addressable memory searches for entries having values that match input data. This is referred to hereinafter as a content addressable search.

The procedures for performing on-the-fly selective global communication using the cluster number table and global communication flag is shown in FIGS. 4 and 5.

First, as shown in FIG. 4(*a*), when an instruction is registered in the instruction window, the number of the cluster to which the instruction is to be registered is written to the entry of the cluster number table corresponding to the instruction destination physical register number (dst), and the global communication destination flags in the instruction window are all set to 0 (pre-process: step S101).

At the same time, as shown in FIG. 4(*b*), the cluster number table is referred to using the source physical register number (src), and a comparator C determines whether or not the cluster number (source side) read from the referenced table is the same as the cluster number (destination side) in which the instruction is registered (step S102).

If the cluster numbers are the same (step S102: YES), the instruction window determines that a previous instruction having a data dependency relationship exists in the instruction window of the same cluster, and global communication is not performed (step S103).

If the cluster numbers do not match (step S102: NO), content addressable searches are performed on a plurality of instruction windows using the source physical register number (src) to find a previous instruction in the instruction window (step S104). When an instruction window storing a previous instruction having a data dependency relationship is found in another cluster, the previous instruction in the instruction window of the other cluster is flagged by raising a global flag indicating that the cluster is a global communication destination for an execution result (step S105). Then, when an instruction is issued from the instruction window, the cluster refers to the global communication destination flag in the instruction window, and the execution result is global communicated to the other cluster with the raised flag (step S106). In this way, the comparator C, instruction window, and cluster function as a control unit to perform selective global communication.

The superscalar processor 1 of the first embodiment has the advantages described below.

(1) When it is found that a value generated by a cluster is used by another cluster, the value generated by that cluster is selectively global communicated to the other cluster. There is a greater possibility of valid values being held in the register cache RC of a cluster by such global communication. In this way, the miss rate of the register cache RC in the clustered superscalar processor decreases. This decreases the possibility of miss penalties and improves performance.

(2) Data dependency of instructions in the instruction windows 51 and 61 is analyzed to determine whether or not global communication should be performed. Since data dependency is analyzed for selective global communication in this manner, the instruction execution result can be transmitted to other clusters which require that execution result based on the data dependency of instructions in the instruction windows 51 and 61.

(3) Subsequent execution results are global communicated only to the register cache RC of clusters which will certainly use the execution result. Thus, pollution of register caches RC that do not need the value is prevented, and register caches RC are used efficiently.

The number of clusters in the first embodiment is not limited to two, and may also be three or more. Even when there are a plurality of clusters in such manner, when a previous instruction with a data dependency relationship exists in the instruction window of another cluster, the register cache RC miss rate is reduced and performance is improved by selective global communication of the execution result to that cluster.

The processor 1 is not limited to the previously described structure inasmuch as the processor 1 may have the structure described below.

(a) A plurality of clusters, each having an instruction window, an upper level register file for receiving an instruction from the instruction window, outputting a register value in accordance with the instruction, and storing an instruction execution result, and a functional unit for executing an instruction using the register value;

(b) a lower level register file, connected to a plurality of clusters, for storing execution results of a plurality of functional units;

(c) a bypass route for connecting a plurality of clusters; and (d) a control unit for performing global communication to communicate an instruction execution result generated by the functional unit of one cluster to another cluster through a bypass route.

A superscalar processor according to a second embodiment of the present invention will now be described with reference to the drawings.

The superscalar processor of the second embodiment realizes the "on-the-fly" of the first embodiment by another "check-and-write."

Figure 6:
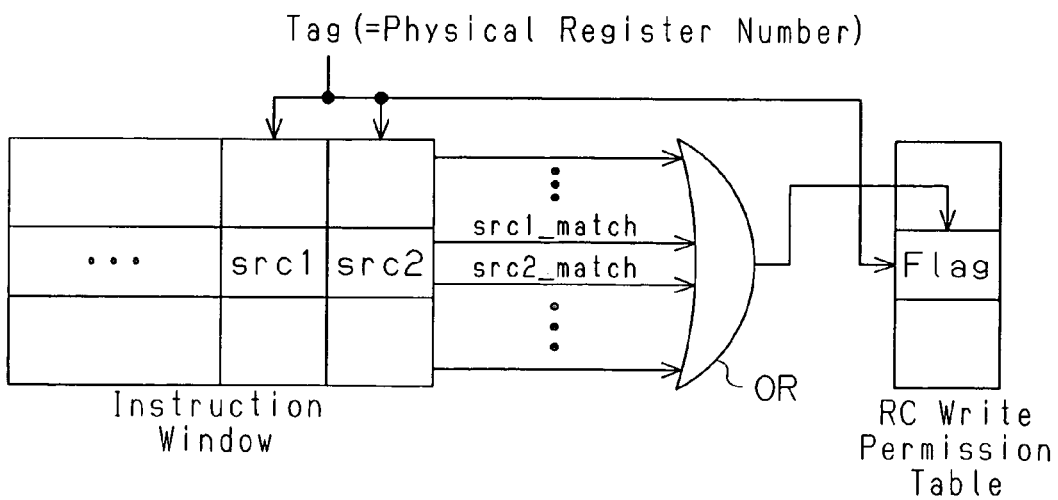
FIG. 6 is a hardware structural diagram illustrating selective global communication in a clustered superscalar processor according to a second embodiment of the present invention.

This check-and-write is described in reference to the first embodiment while referring to FIGS. 6 and 7. FIG. 6 is a hardware structural diagram illustrating the check-and-write operation. FIG. 7 is a flowchart illustrating the check-and-write processing procedure.

Check-and-write will first be summarized. In check-and-write, when an instruction is issued from the instruction windows 51 and 61, the control unit checks whether or not the other instruction window 51 and 61 includes an instruction that refers to the execution result of that instruction (step S201 described later). When there is an instruction that is referred to (step S202: YES described later), the control unit global communicates the execution result to the register caches RC of clusters which are allocated that instruction.

In order to realize "on-the-fly" in check-and-write, each cluster has a permission table for writing to the register cache RC (FIG. 3), as shown in FIG. 6. This permission table indicates permission to write to the register caches RC of clusters of each physical register. The table index indicates the physical register numbers, and the entry contents are 1-bit flags indicating write permission. The procedure of selective global communication by "on-the-fly" will now be described using the write permission table of the register cache RC.

First, a tag indicating that an execution result is usable is sent to the instruction window before one cycle period in which the instruction execution result is sent from another cluster. It is preferred that the number of the physical register storing this execution result is used as this tag. When a tag is sent to the instruction window, the tag is compared, for example, with the previously mentioned first source operand src1 and second source operand src2 in the instruction window (step S201). If an instruction exists which uses that execution result, and the tag and the operand match (step S202: YES), a corresponding ready bit is set (step S203). In other words, if the tag does not have a match in the instruction window, there is no instruction which requires the execution result in that instruction window. Therefore, when the tag does have a match in the instruction window, the execution result is written to the register cache RC of that cluster (step S204), and the execution result is not written if there is no match (step S205), thereby realizing "on-the-fly."

A result obtained by an OR calculation of all comparison results (for example, src1_match, src2_match) of instruction window entry tags is written in the entry corresponding to the tag of the write permission table of the register cache RC.

Whether or not to write the execution result from another cluster in a global communication to the register cache RC of a target cluster is determined by referring to the flag of the write permission table of the register cache RC.

The superscalar processor of the second embodiment has the same advantages as advantages (1) through (3) of the superscalar processor 1 of the first embodiment.

A superscalar processor according to a third embodiment of the present invention will now be described below with reference to the drawings. The superscalar processor of the third embodiment performs selective global communication (global communication prediction) among clusters using a different on-the-fly method than the first embodiment and second embodiment. Global communication prediction is a method which, when the execution result of a certain instruction has been referred to a number of times in the past by another cluster, determines whether or not to perform global communication the next time the same instruction is executed based on the number of such past references.

Global communication prediction will now be described with reference to the drawings. FIG. 8(*a*) is a hardware structural diagram showing a global communication determination table, and FIG. 8(*b*) is a hardware structural diagram showing a global communication request table.

As shown in FIG. 8(*a*), in the global communication prediction, a global communication determination table is prepared to indicate which instructions need global communication. The index of this table is set in a lower rank bit of the instruction address, and the table has a tag for instruction recognition, a 2-bit saturation counter (2*bc*) for determining whether or not to perform global communication, and an update flag indicating whether the 2*bc* has been updated after the previous instruction was registered in the instruction window. The tag for instruction recognition uses an upper rank bit which is not used for indexing in the instruction address. As shown in FIG. 8(*b*), a global communication request table is prepared to reflect the global communication requests of a particular physical register in the global communication request table. The index of this table is set to the physical register number, and the instruction address and cluster number (cls) are registered in the table.

Figure 9:
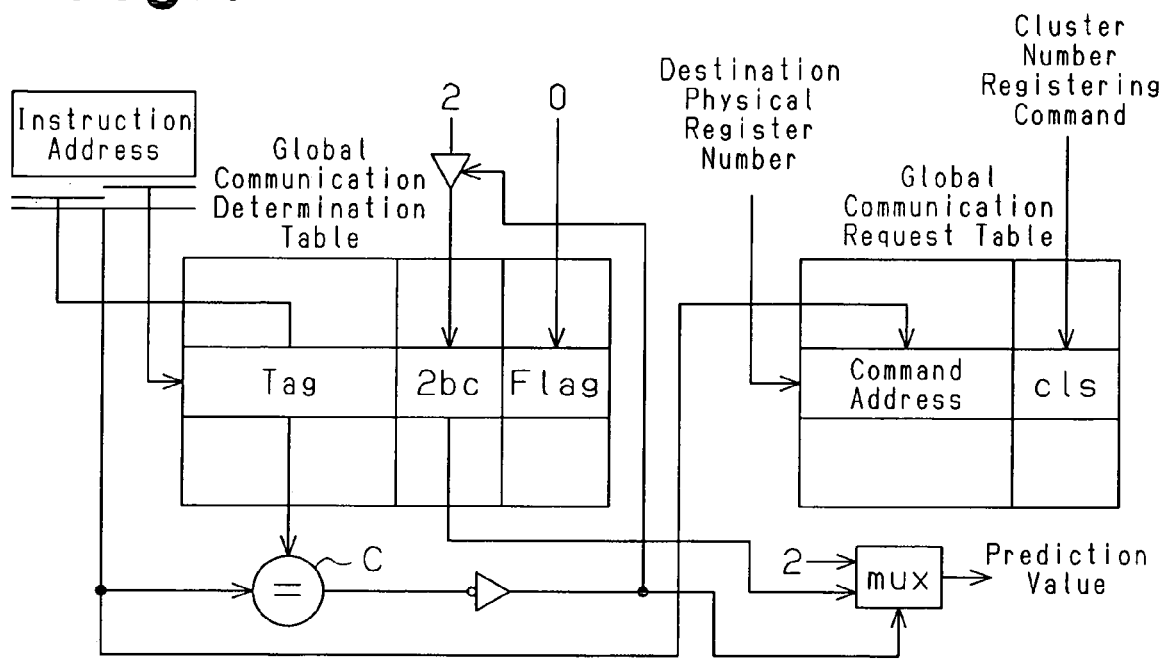
FIG. 9 is a hardware structural diagram illustrating a processing procedure for registering an instruction in an instruction window of a clustered superscalar processor according to a third embodiment of the present invention.
Figure 10:
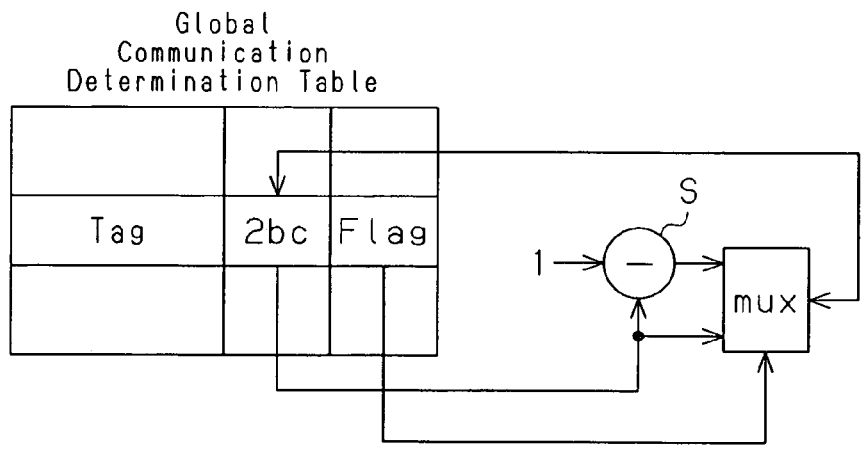
FIG. 10 is a hardware structural diagram illustrating the procedures for updating a two-bit saturation counter ($2bc$) in the clustered superscalar processor of the third embodiment.
Figure 11:
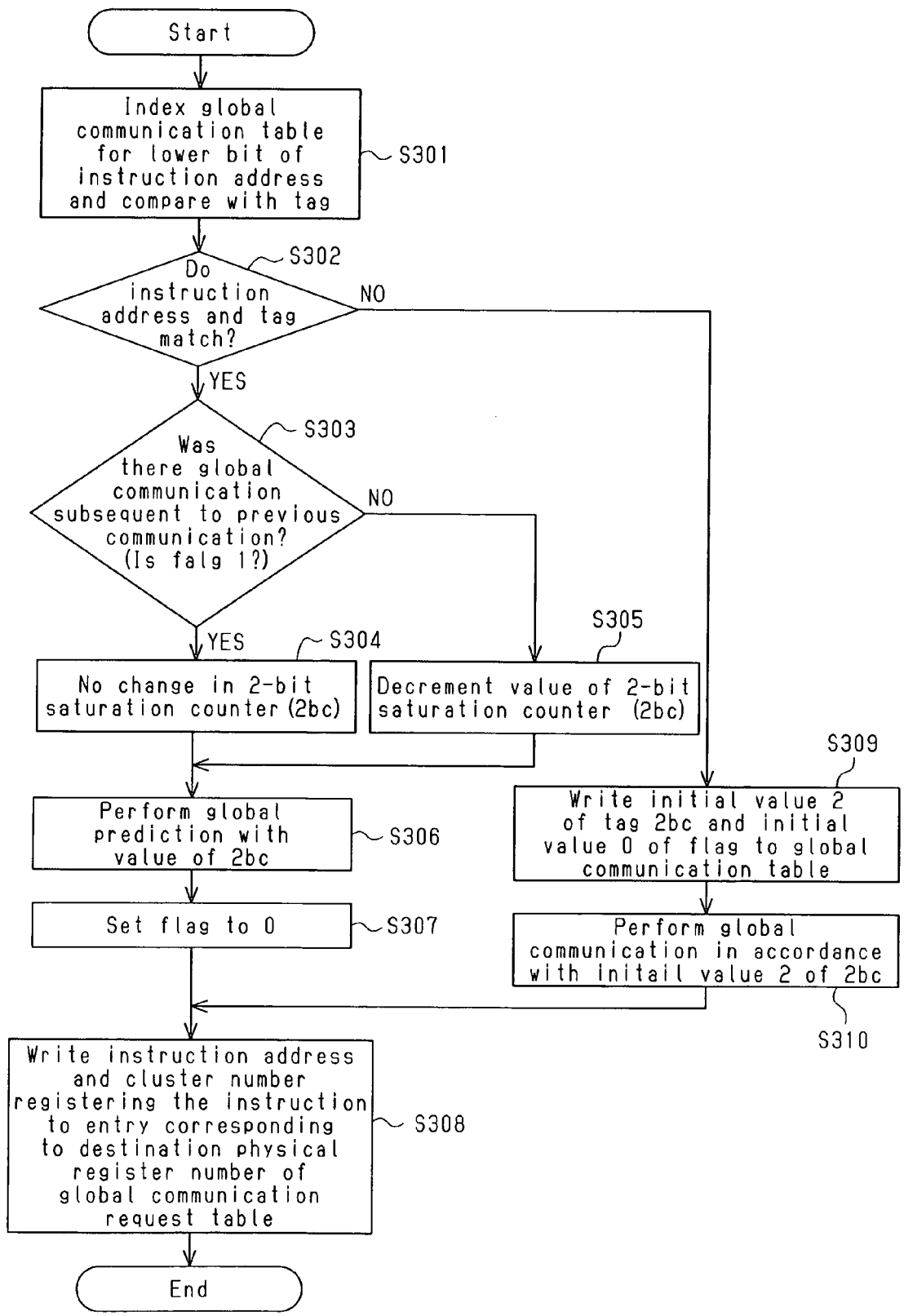
FIG. 11 is a flowchart illustrating the processing procedures for registering an instruction in an instruction window of the clustered superscalar processor of the third embodiment.

The method for determining global communication and the update procedure of the global communication determination table and the global communication request table when an instruction is registered in the instruction window will now be described with reference to FIGS. 9 through 11. FIG. 9 is a hardware structural diagram illustrating the processing sequence when an instruction is registered in the instruction window, FIG. 10 is a hardware structural diagram illustrating the update procedures of the 2-bit saturation counter (2*bc*), and FIG. 11 is a flowchart illustrating the processing procedure when an instruction is registered in the instruction window. This process is performed each time an instruction is input to the instruction window. The initial value of the 2-bit saturation counter (2*bc*) is set at 2, and the initial value of the update flag is set at 0.

First, the global communication determination table is indexed at the lower rank bit of the instruction address, and compared with the upper rank bit of the instruction address (step S301). As shown in FIG. 9, the comparator C, for example, is used for this comparison. The comparator C determines whether or not the instruction address and the tag match (step S302). If the instruction address and the tag match (step S302: YES), a determination is then made as to whether or not global communication occurred after the previous instruction was registered (step S303). If there was global communication after the previous instruction was registered (flag set to 1, step S303: YES), the value of the 2-bit saturation counter (2*bc*) of the global communication determination table is maintained without change (step S304).

If global communication has not occurred after the previous instruction was registered (flag set at 0, step S303: NO), the 2*bc* of the global communication determination table is decremented (decreased). That is, the value of 2*bc* is reduced by 1 using, for example, a subtractor S, as shown in FIG. 10 (e.g., if the initial value of 2*bc* is 2, the value of 2*bc* is decreased by 1). A multiplexer (data selector) mux receives the value subtracted by the subtractor S and the value before subtraction, and selects one of the input values in response to, for example, a control signal corresponding to the value of a flag. In this way, the value of 2*bc* is updated to a selected value by the multiplexer.

Then, the global communication prediction is performed using the 2*bc* value (step S306). In the global communication prediction, the multiplexer mux receives the 2*bc* value and the value "2", and, in response to a control signal corresponding to the comparison result of the comparator C, for example, selects one of the input values, and outputs the selected value as the prediction value, as shown in FIG. 9. After the global communication prediction has been performed, the flag is reset at the initial value 0 (step S307), and the instruction address and cluster number cls registering the instruction are written in entries corresponding to the destination physical register number of the global communication request table, as shown in FIG. 9 (step S308).

If the instruction address and tag do not match (step S302: NO), then the tag and the initial value of the 2*bc* (low prediction for global communication) and the initial flag value 0 are written to the global communication determination table (step S309). In this case, the 2*bc* initial value is set at "2", and global communication is performed (step S310). After the global communication is performed, the process of step S308 described above is performed.

Figure 12:
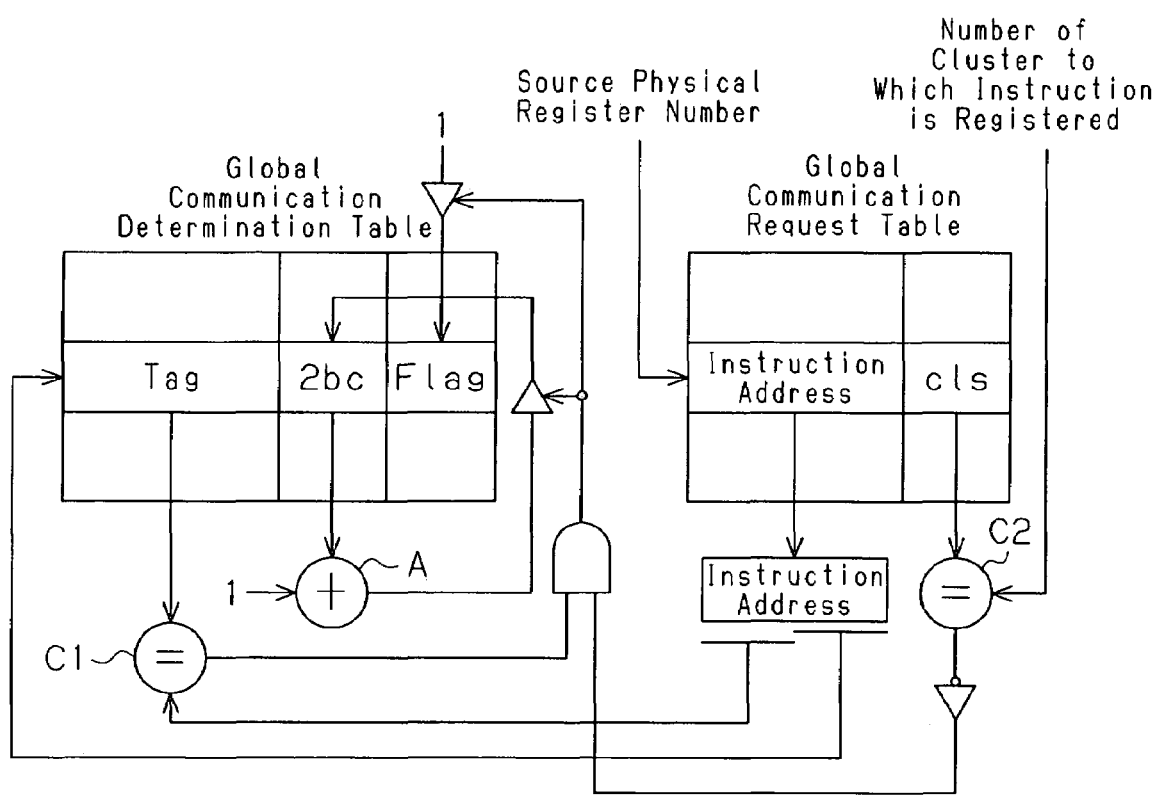
FIG. 12 is a hardware structural diagram illustrating a registration process of a global communication request in the clustered superscalar processor of the third embodiment.
Figure 13:
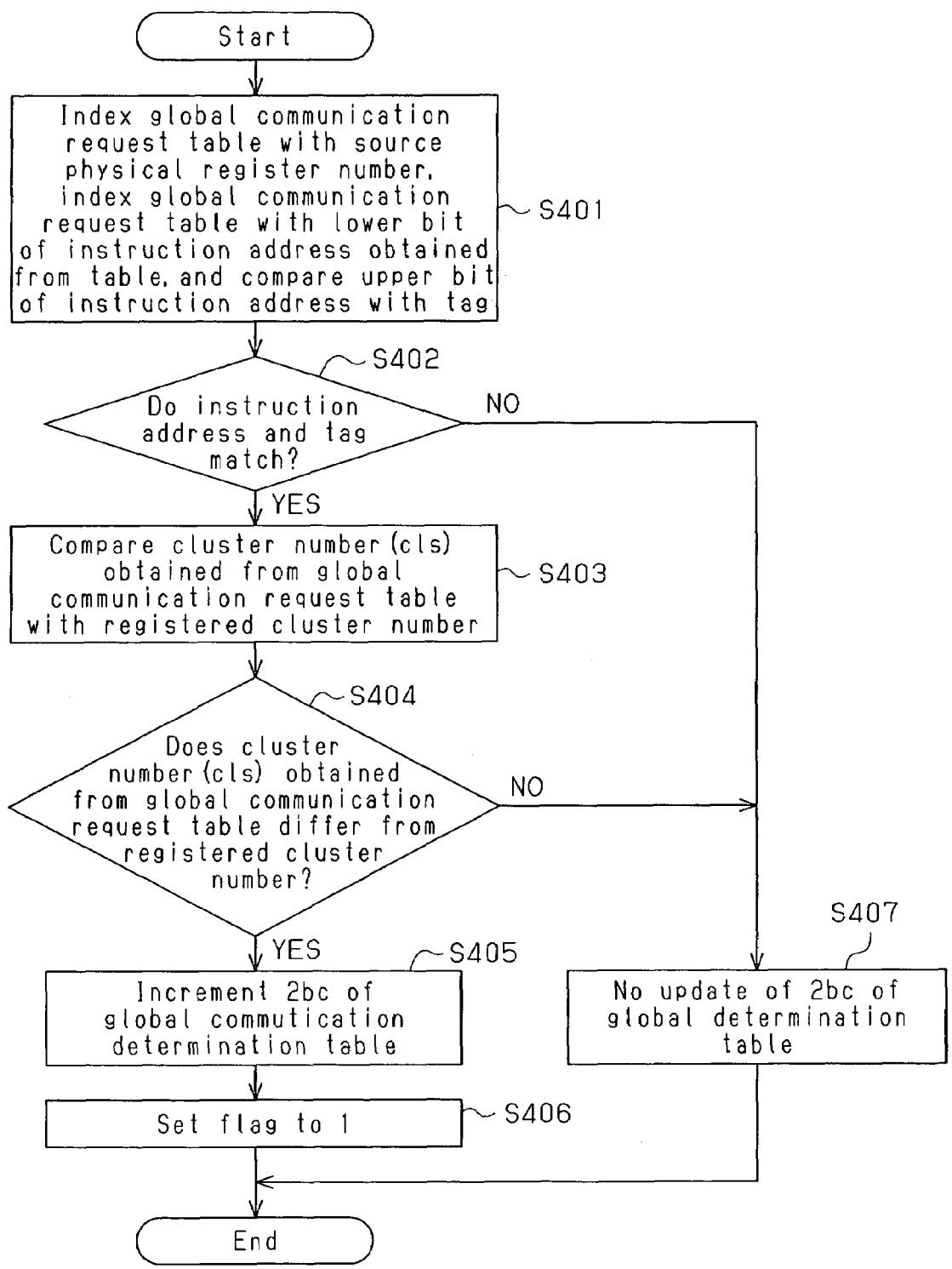
FIG. 13 is a flowchart illustrating the processing procedures for registering global communication requests by subsequent instructions in the clustered superscalar processor of the third embodiment.

The registration of the global communication request by a subsequent instruction will now be described below with reference to FIGS. 12 and 13. FIG. 12 is a hardware structural diagram showing the registration process of the global communication request, and FIG. 13 is a flowchart showing the processing procedure for registering the global communication request by a subsequent instruction. This process is performed each time an instruction is input in the instruction window.

First, the global communication request table is indexed with the source physical register number, the global communication determination table is indexed with the lower rank bit of the instruction address obtained from the table, and the tag and upper rank bit of the instruction address are compared (S401). This comparison is performed using, for example, a comparator C1 as shown in FIG. 12. Then, the comparator C1 determines whether or not the tag and the upper rank bit of the instruction address match (step S402). When the tag and the upper rank bit of the instruction address match (step S402: YES), then the cluster number (cls) obtained from the global communication request table and the cluster number of the cluster registering the instruction are compared (step S403). This comparison is accomplished, for example, using a comparator C2. The comparator C2 determines whether or not the cluster number (cls) obtained from the global communication request table differs from the cluster number of the cluster registering the instruction (step S404). The 2bc of the global communication determination table is incremented (increased) based on the AND conditions of the cluster number (cls) obtained from the global communication request table differing from the cluster number of the cluster registering the instruction (step S404: YES), and the matching of the tag and upper rank bit of the instruction address (step S402: YES). That is, the value of 2bc is incremented (increased), for example, using an adder A, as shown in FIG. 12. Furthermore, the flag is set at 1 (step S406).

When the AND conditions are not satisfied (at least one of step S402 and step S404 is NO), that is, when the subject of data dependency is not registered in the table or an execution result is generated in the same cluster when there is data dependency, the value of 2bc is not updated in the global communication determination table (step S407).

In this manner information referred to from other clusters in the past is registered as a flag in the global communication determination table (step S406), and the 2-bit saturation counter (2bc) is controlled to determine whether or not to perform global communication (step S304 or step S305). Then global communication is performed using the 2bc value. The global communication is not performed, for example, when the value of 2bc is "0" or "1". Global communication may be enabled by determining beforehand to perform global communication when the value of 2bc is "2" or "3".

The superscalar processor of the third embodiment has the following advantages in addition to advantage (1) of the superscalar processor 1 of the first embodiment.

In the third embodiment, global communication prediction is performed in accordance with the past history. Thus, global communication may be performed between clusters having a data dependency between chronologically (sequentially) separated instructions.

The present examples and embodiments are to be considered as illustrative and not restrictive, and the invention is not to be limited to the details given herein, but may be modified within the scope and equivalence of the appended claims.

What is claimed is:

1. A clustered superscalar processor comprising:
  a plurality of clusters, each cluster including:
    an instruction window for storing instructions;
    an upper level register file for outputting a register value in accordance with the instructions and storing an execution result of each instruction; and
    a functional unit for executing the instruction with the register value, wherein the execution result of each of the instructions is written to the upper level register file;
  a lower level register file, connected to the plurality of clusters, for storing execution results of the functional units;
  a bypass route connected between the plurality of clusters; and
  a control unit for communicating the execution result of the instruction generated by the functional unit of one of the clusters to another cluster via the bypass route, wherein the control unit determines whether or not another cluster will use the execution result of the instruction of the one of the clusters before the one of the clusters executes the instruction, and selectively communicates the instruction execution result of the one of the clusters to the upper level register file of another cluster that requires the instruction execution result based on the determination result.

2. The clustered superscalar processor according to claim 1, wherein the control unit communicates the execution result of the one of the clusters to another cluster that requires the execution result based on a dependency relationship between instructions.

3. The clustered superscalar processor according to claim 1, wherein the control unit checks before storing an instruction in the instruction window whether there is a data dependency relationship between the instruction that will be stored in the instruction window and a previous instruction stored in the instruction window, and when an instruction having a data dependency relationship with the previous instruction stored in the instruction window of one of the clusters is stored in the instruction window of another cluster, the control circuit requests one of the clusters to communicate the execution result of the previous instruction to another cluster.

4. The clustered superscalar processor according to claim 1, wherein the control unit includes:
  a comparator for checking before an instruction is stored in the instruction window whether or not a cluster including an instruction window storing a previous instruction is the same as a cluster including an instruction window storing an instruction having a data dependency relationship with the previous instruction;
  wherein when the two clusters are not the same, the instruction window storing the previous instruction sets a flag specifying to communicate the execution result of the previous instruction stored in the instruction window of one of the clusters to another cluster that includes the instruction window storing the instruction having a data dependency relationship with the previous instruction.

5. The clustered superscalar processor according to claim 1, wherein when an instruction is issued from the instruction window of one of the clusters, the control unit checks whether or not a subsequent instruction that refers to the execution result of said instruction is stored in the instruction window of another cluster, and when there is a referring subsequent instruction, the control unit communicates the instruction execution result of the one of the clusters to another cluster having the subsequent instruction that refers to the execution result.

6. The clustered superscalar processor according to claim 1, wherein the plurality of clusters includes a first cluster and a second cluster, the first cluster providing the second cluster with a tag indicating that an execution result of an instruction is usable before the execution result is generated, and the control unit determining whether or not the tag and the instruction provided to the second cluster match and communicating the execution result of the instruction generated by the functional unit of the first cluster to the second cluster when the tag and instruction match.

7. The clustered superscalar processor according to claim 6, wherein the control unit sets a flag permitting storage of the execution result of the instruction in the upper level register of the second cluster when the tag and the instruction match.

8. The clustered superscalar processor according to claim 1, wherein the control unit counts the number of times the execution result of an instruction of one of the clusters was referred to by another cluster, and communicates the execution result of the one cluster to the another cluster that requires the execution result based on the count number.

9. A method for controlling communication between clusters in a clustered superscalar processor including a plurality of clusters, each cluster including an instruction window for storing instructions, an upper level register file for outputting a register value in accordance with the instructions and storing an execution result of each instruction, and a functional unit for executing the instruction with the register value, wherein the execution result of each of the instructions is written to the upper level register file, a lower level register file, connected to the plurality of clusters, for storing execution results of the functional units, and a bypass route connected between the plurality of clusters, the method comprising:

generating an execution result of an instruction of the functional unit of one of the clusters;

determining whether or not another cluster will use the instruction execution result of the one of the clusters before the one of the clusters executes the instruction; and selectively communicating the instruction execution result of the one of the clusters via the bypass route to the upper level register file of another cluster that requires the instruction execution result based on the determination result.

10. The communication control method according to claim 9, wherein said communicating includes communicating the execution result of the one of the clusters to another cluster that requires the execution result based on a dependency relationship between instructions.

11. The communication control method according to claim 9, further comprising:

checking before storing an instruction in the instruction window whether there is a data dependency relationship between the instruction that will be stored in the instruction window and a previous instruction stored in the instruction window; and when an instruction having a data dependency relationship with the previous instruction stored in the instruction window of one of the clusters is stored in the instruction window of another cluster, requesting one of the clusters to communicate the execution result of the previous instruction to another cluster.

12. The communication control method according to claim 9, further comprising:

checking before an instruction is stored in the instruction window whether or not a cluster including an instruction window storing a previous instruction is the same as a cluster including an instruction window storing an instruction having a data dependency relationship with the previous instruction; and when the two clusters are not the same, setting a flag specifying to communicate the execution result of the previous instruction stored in the instruction window of one of the clusters to another cluster that includes the instruction window storing the instruction having a data dependency relationship with the previous instruction.

13. The communication control method according to claim 9 further comprising when an instruction is issued from the instruction window of one of the clusters, checking whether or not a subsequent instruction that refers to the execution result of said instruction is stored in the instruction window of another cluster, wherein said communicating includes when there is a referring subsequent instruction, communicating the instruction execution result of the one of the clusters to the another cluster having the subsequent instruction that refers to the execution result.

14. The communication control method according to claim 9, wherein the plurality of clusters includes a first cluster and a second cluster, the method further comprising:

providing the second cluster with a tag indicating that an execution result of an instruction is usable before the execution result is generated; and determining whether or not the tag and the instruction provided to the second cluster match;

wherein said communicating includes communicating the execution result of the instruction generated by the functional unit of the first cluster to the second cluster when the tag and instruction match.

15. The communication control method according to claim 14, further comprising setting a flag permitting storage of the execution result of the instruction in the upper level register of the second cluster when the tag and the instruction match.

16. The communication control method according to claim 9, further comprising counting the number of times the execution result of an instruction of one of the clusters was referred to by another cluster;

wherein said communicating includes communicating the execution result of the one cluster to the another cluster that requires the execution result based on the count number.

* * * * *